United States Patent [19]

Juday

[11] Patent Number: 5,052,807

[45] Date of Patent: Oct. 1, 1991

[54] THREE DIMENSIONAL MOIRE PATTERN ALIGNMENT

[75] Inventor: Richard D. Juday, Houston, Tex.

[73] Assignee: The United States of America as represented by the Administrator of the National Aeronautics and Space Administration, Washington, D.C.

[21] Appl. No.: 545,177

[22] Filed: Jun. 28, 1990

[51] Int. Cl.$^5$ ............................................. G01B 11/00
[52] U.S. Cl. ...................................... 356/375; 356/399
[58] Field of Search ............... 356/138, 153, 372, 373, 356/374, 375, 399; 250/237 G

[56] References Cited

U.S. PATENT DOCUMENTS

| | | | |
|---|---|---|---|
| 3,604,813 | 9/1971 | Kronnie et al. | 356/172 |
| 3,689,162 | 9/1972 | Ferguson | 356/399 |
| 3,799,678 | 3/1974 | Kerr | 356/169 |
| 3,957,378 | 5/1976 | Zipin | 356/169 |
| 4,166,699 | 9/1979 | Bergkvist | 356/375 |
| 4,245,912 | 1/1981 | Bergkvist | 356/374 |
| 4,572,952 | 2/1986 | March | 250/237 |
| 4,696,574 | 9/1987 | Penney | 356/375 |

OTHER PUBLICATIONS

"Development of Moire Machine Vision", Kevin G. Harding, NASA Conference Publication 2491, First Annual Workshop on Space Operations Automation & Robotics (SOAR '87), pp. 413–418, Aug. 5–7, 1987.

Primary Examiner—F. L. Evans
Attorney, Agent, or Firm—Hardie R. Barr; Harold W. Adams; Edward K. Fein

[57] ABSTRACT

An apparatus for determining three dimensional positioning relative to a predetermined point utilizing moire interference patterns such that the patterns are complementary when viewed on axis from the predetermined distance. Further, the invention includes means for determining rotational positioning in addition to three dimensional translational positioning.

10 Claims, 7 Drawing Sheets

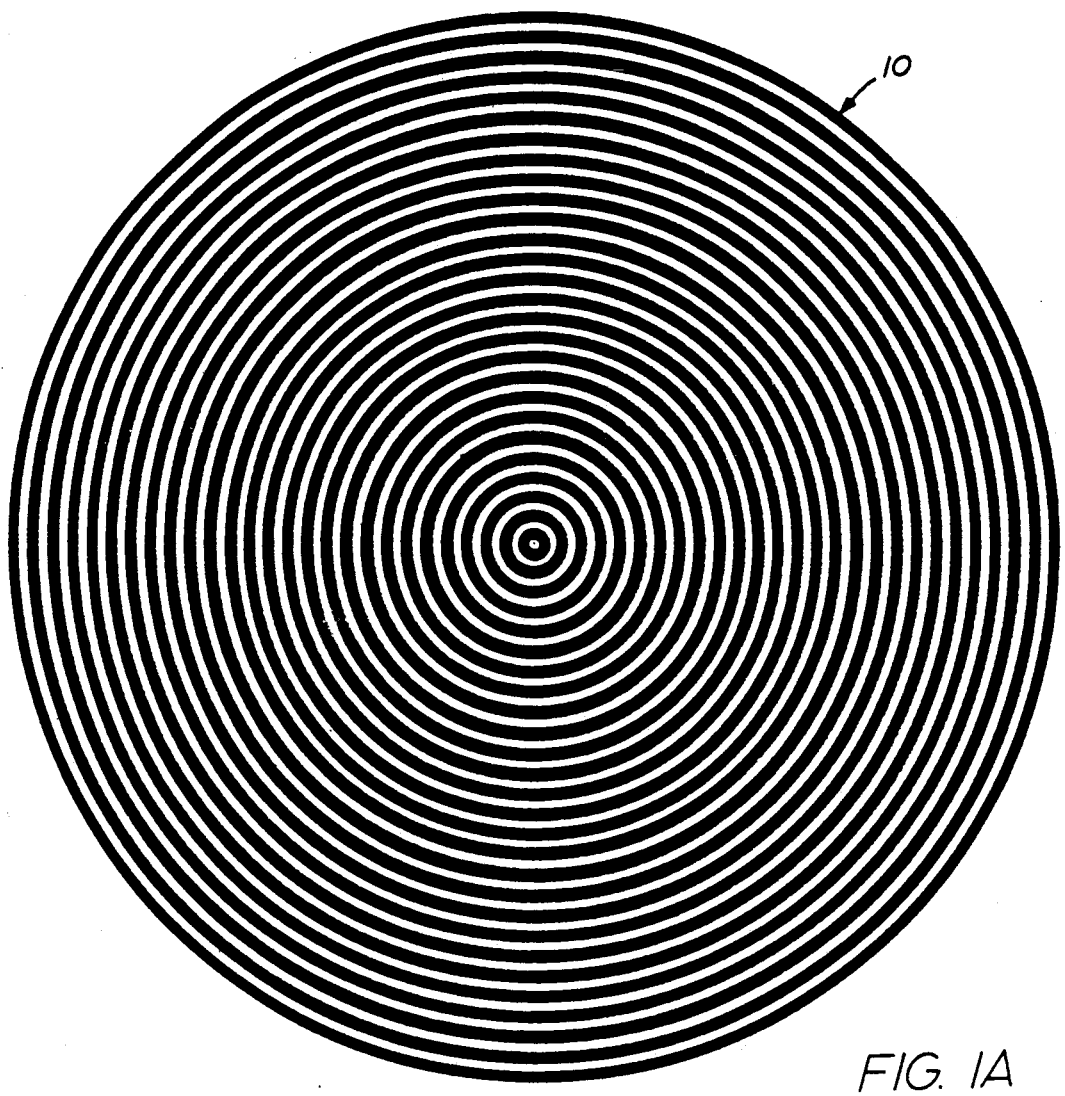
FIG. IA
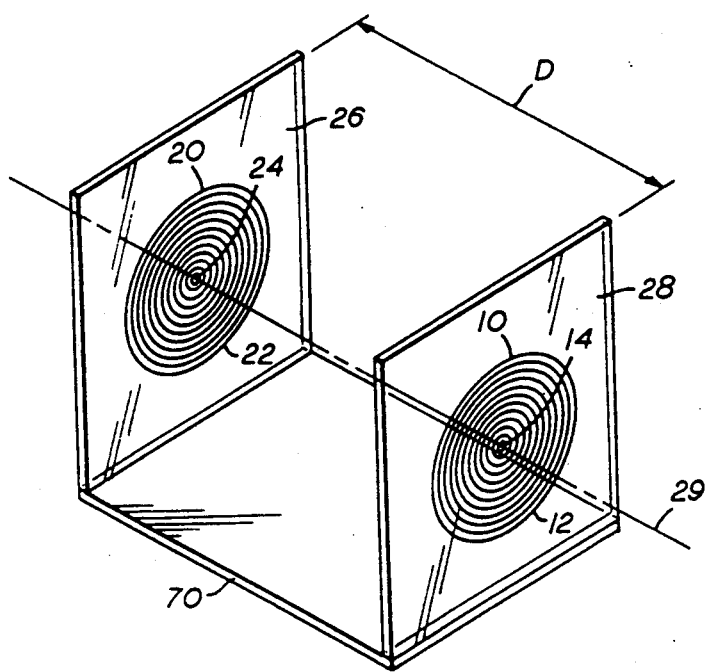
FIG. IB

THREE DIMENSIONAL MOIRE PATTERN ALIGNMENT

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

The present invention relates to the use of a moire pattern to determine the position of a view point relative to a predetermined reference point in three dimensional space. The invention also relates to a means for designing the moire pattern such that differing degrees of sensitivity may be determined relative to the reference point and the moire pattern.

2. General Background

The use of moire patterns to determine position relative to a plane of viewing has long been known in the prior art. Moire patterns are generally formed using two "templates," each of which has a grid pattern of alternating light and dark areas. The template patterns are aligned and placed one behind the other. When viewed form a view point in which the template patterns are not aligned, the viewer will perceive a superposition pattern of large alternating light and dark zones arising from the interference of the patterns. These patterns are coarser than the actual grid pattern and represent the low or "beat" frequency of the interference. As a viewer out of alignment with the plane of the moire templates, the beats will appear to "run" indicating the misalignment of the viewer with the plane of the templates.

3. Prior Art

This phenomenon has been utilized in a number of devices to determine position relative to a plane. U.S. Pat. No. 3,604,813 describes the use of moire patterns in a device known as a "planoscope." This invention disclosed the use of two moire grids lying in intersecting planes which were perpendicular to a vertical grid pattern of differing pitch for each of the grids. The invention created an image behind the planoscope which would indicate whether the viewer was to the left or right of the plane bisecting the center of the moire grids. The invention also disclosed that a party could estimate the distance form the planoscope by a determination of the number of beats the viewer perceived. Thus, the viewer was provided with visual information relating to two dimensions: lateral position with respect to the bisecting plane and distance from the planoscope However, the invention did not indicate how to determine distance from the planoscope as a function of the number of beats. Further, the invention required that the moire grids be fixed with respect to each other.

U.S. Pat. No. 4,166,699 disclosed another planoscope structure which utilizes three moire grids to determine view point position relative a plane perpendicular to the moire grids. The invention utilized three planar grids to create a moire pattern which would indicate whether the viewer was above or below the perpendicular plane. The sensitivity of the pattern could be determined by the pitch of the grid and the angle formed between the patterns. As with U.S. Pat. No. 3,604,813, a viewer could infer the distance form the planoscope as a function of the number of beats perceived. Again, the grids maintained a fix position with respect to each other.

U.S. Pat. No. 4,245,912 disclosed a similar structure comprising three planar moire grids enclosed in a parallelpiped box with mirrors to permit improved viewing utilizing ambient or artificial light. As in U.S. Pat. No. 4,166,699, the moire patterns provided visual information relative to a perpendicular plane passing through the three moire grids. Further, a viewer could again infer distance to the planoscope as a function of the number of beats perceived.

U.S. Pat. No. 3,957,378 disclosed a moire pattern transducer which gave the viewer alignment information in two dimensions. The invention disclosed the use of grid patterns comprising orthogonal line patterns and an index piece The invertion was used to detect alignment and recited a structure which called for a controlled rotational movement of the masks relative to each other. Further, detection of alignment position was accomplished by means of a plurality of photodetectors mounted essentially above the grid patterns. The invention permitted the user to accomplish alignment in essentially the X-Y plane but did not provide the user information related to the distance from the patterns generated.

U.S. Pat. No. 4,572,952 utilized moire pattern detection by a charged coupled device ("CCD") to determine linear or angular position. The invention disclosed the use of a single mask having grid patterns of differing pitches which created the moire pattern. The invention called for a partly moving transmissive mask with scales of varying pitch which created a moire pattern detected by a two dimensional CCD which permitted accurate interpolation of the angular position of a shaft or linear position. The invention did not provide information relating to position detection in three dimensional space. Further, the detector for the structure (the CCD) had to remain in close proximity to the mask.

It will be appreciated that none of the above inventions provided a suitable means of determining three dimensional position relative to a predetermined point. Further, while U.S. Pat. No. 4,572,952 provided information relative to rotational or angular positioning, it was incapable of providing orthogonal three dimensional information as well.

SUMMARY OF THE PRESENT INVENTION

The present invention is directed toward the use of moire patterns to determine the position of the viewer in three dimensional space relative to a predetermined position in space. It is an advantage of the present invention that the masks used need not maintain a fixed position relative to each other. Rather the masks as used in the present invention may be moveable relative to each other and need not be planar in form. Further, the present invention is designed to provide information relative to three dimensional orthogonal positioning and rotational positioning.

Detection and interpretation of the moire pattern created by the present invention is designed to be made by the human eye. However, the present invention may include the use other optical detecting devices. As such the detector need not be in close proximity with both of the moire masks.

As the present invention is designed to determine position and rotation relative to a predetermined standoff point in three dimensional space, it is also an object of the invention to design a mask which readily permits human resolution of the moire patterns. The present invention also includes a means of determining sensitivity and design of the moire pattern relative to the desired standoff distance

BRIEF DESCRIPTION OF THE DRAWINGS

FIGS. 1A is illustrative of moire templates 10 and 20 of two dimensional positioning as demonstrated in the present invention. FIG. 1B is an illustration of how templates 10 and 20 may be used in a planoscope.

DETAILED DESCRIPTION OF THE DRAWINGS

Figure 2A:
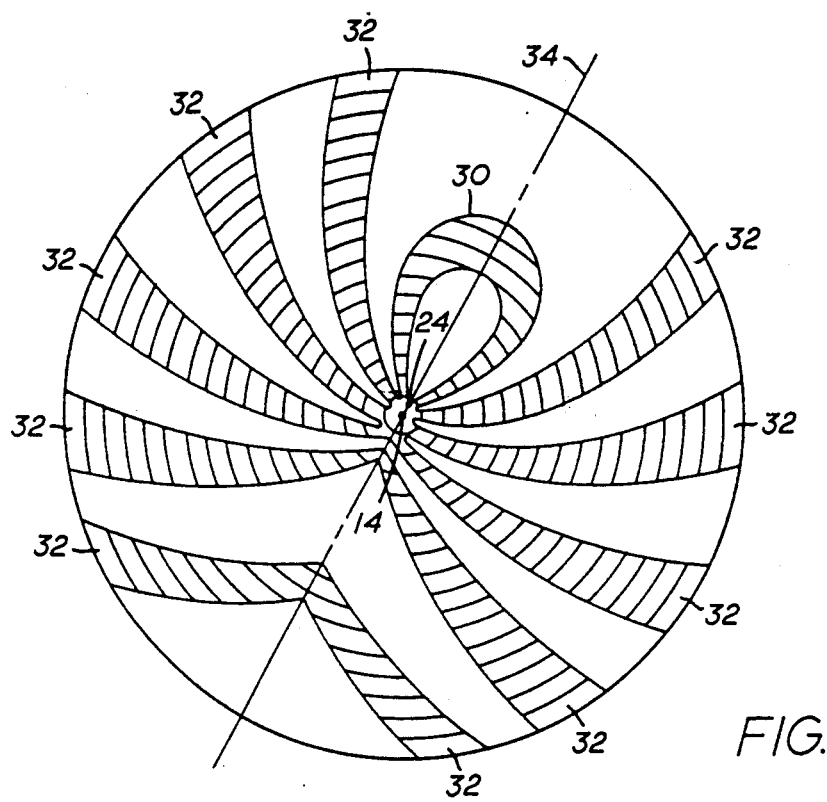
FIGS. 2A and 2B are illustrative of moire interference patterns created by the apparatus of FIG. 1B.

FIG. 1A is illustrative of the type of moire template 10 which may be used in the present invention. Template 10 is depicted as a series of partly black, partly light transmissive concentric circles 12 about a center point 14 lying in a single plane. It should be noted that the present invention does not require that the template 10 lie in a plane, only that the pattern, when viewed along the pattern axis, appear complementary with template 20. Template 20 is also composed of a series of partly black, partly light transmissive concentric circles 22 about center point 24.

FIG. 1B represents a simple use of templates 10 and 20 as a planoscope. Template 20 is mounted on a rearward wall 26 of box 70. Template 10 is mounted on a forward wall 28 of box 70 and is parallel to rear wall 26 and aligned such that the center points 14 and 24 lie along an axis 29 which is perpendicular to walls 26 and 28. The walls 26 and 28 on which templates 10 and 20 are mounted are separated by a distance D.

Figure 2B:
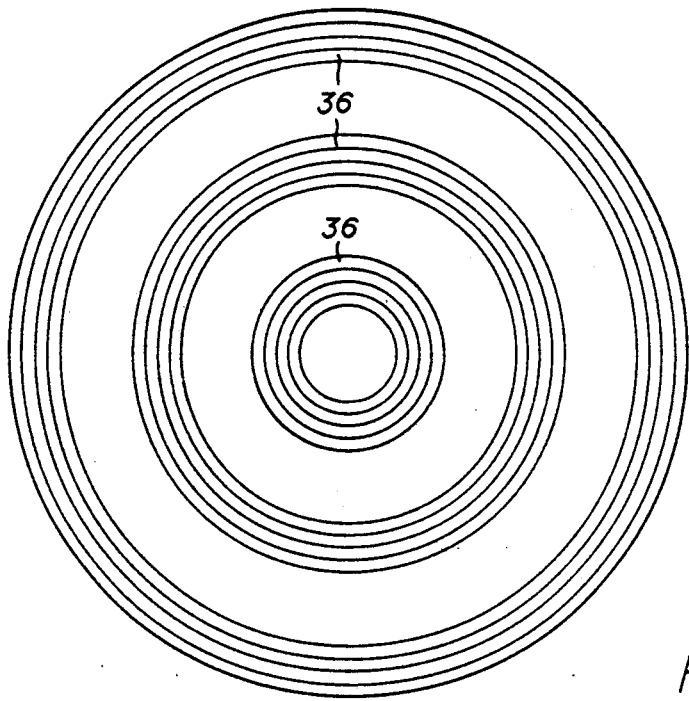
Figure 8:
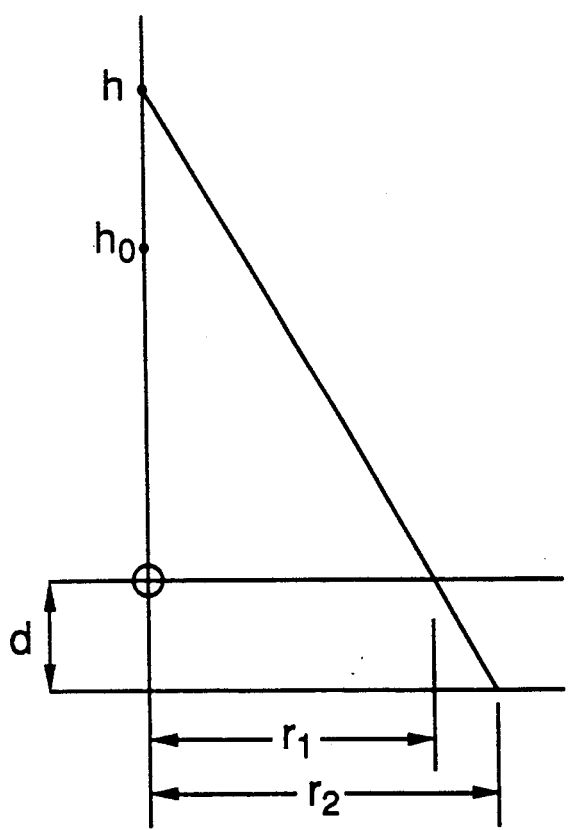
FIG. 8 is a trigonometric representation used to calculate the moire pattern shown in FIG. 3A.
Figure 9:
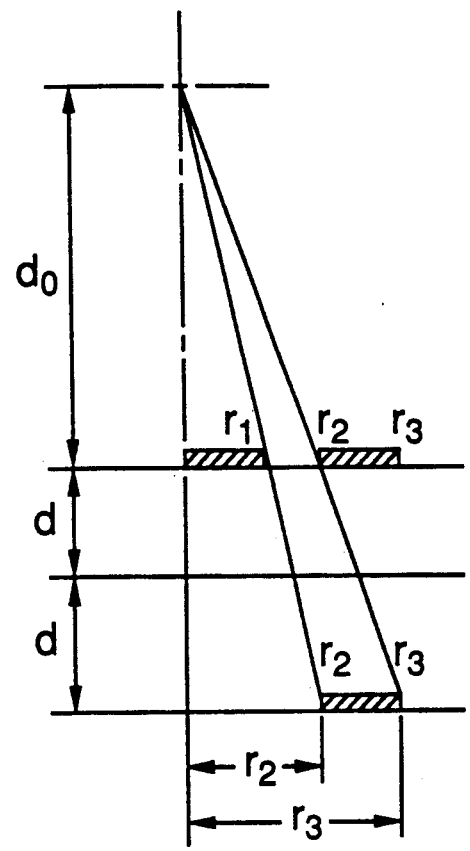
FIG. 9 is a trigonometric representation used to calculate the moire pattern shown in FIG. 3B.

FIG. 2A is an illustration of the moire pattern created when the planoscope of FIG. 1C is viewed from a axis other than axis 29 and from a distance other than the nominal one (labeled $h_0$ in FIGS. 8 and 9. When looking at template 20 through template 10, the viewer perceives a series of symmetrical low frequency "beats" 32, including a "loop beat" 30. For the purposes of this illustration, the high frequency interference pattern formed by the overlap of the individual rings 12 and 22 of templates 10 and 20 is not shown. The beats 30, 32 are symmetrical about an axis formed by a line 34 passing between center points 14 and 24 of templates 10 and 20, respectively. As the viewer moves in a direction from the loop beat 30 along line 34, the viewer will reach axis 29 as shown in FIG. 1B. At that point, the viewer will perceive a series of concentric low frequency beats 36 as shown in FIG. 2B. It will be appreciated that as the viewer moves off axis 29, the interference pattern created will be symmetrical about a vector from the viewpoint to axis 29. Thus, the planoscope as depicted in FIG. 1B gives the viewer information relative to his position to the planoscope in two dimensions, X and Y, and permits the viewer to become aligned with axis 29.

The templates depicted in FIGS. 1A and 1B do not give the viewer information relative to the distance from the planoscope. One object of the present invention is to give the viewer information relative to a predetermined position from the perceived moire pattern. This may be accomplished by the design of the templates such that the templates complement each other at the predetermined distance.

Figures 3A, 3B:
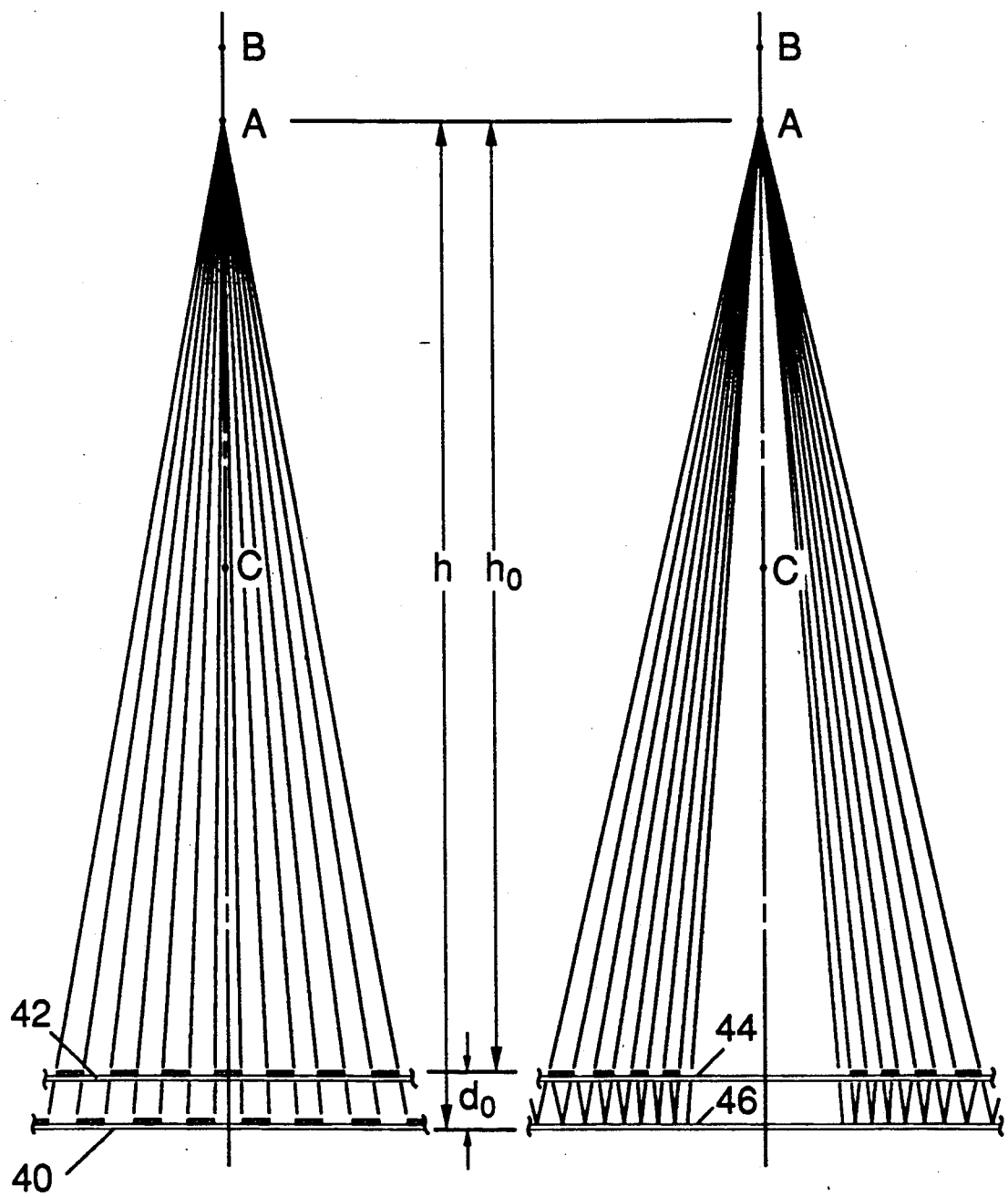
FIG. 3A illustrates the means for determining Z axis position relative to a predetermined point using two moire templates.
FIG. 3B demonstrates how the same effect may be achieved with a remote moire template

Referring now to FIGS. 3A and 3B, which are diagrams for the design of moire templates which will give the user information relative to a predetermined position from the templates as well as information relative to the position in the X and Y axes. Thus, when the viewer is on axis and at the proper distance form the templates, the templates complement each other, for example, an all black solid pattern is perceived.

In FIG. 3A, a first template 40 is positioned at distance h from the nominal viewing point or standoff distance in the Z axis, A. A second template 42 is positioned at the nominal standoff distance $h_0$. The templates 40 and 42 are designed in a manner, which shall be explained below, such that template 40 appears to be the complement of template 42 when projected onto the surface of template 42 from the nominal view point. Where the templates are viewed from a point other than on axis, the common moire pattern interference will appear. When viewed from either point B or C, both points being on axis and behind and in front of view point A, respectively, the viewer will see a moire pattern comprising low frequency beats which appear as concentric circles as shown in FIG. 2B. Only when viewed from nominal distance point A, will the targeted moire patterns exhibit a solid target.

The effect demonstrated in FIG. 3A. is shown using two moire templates which are positioned a distance $d_0$ from each other. However, the present invention contemplates additional structures which will accomplish the same effect. In FIG. 3B a single moire template 44 is used and positioned at distance $d_0$ from a glass or other highly reflective surface 46. In this structure, the viewer will see the solid pattern. at the nominal distance A, the viewer will perceive template 44 and the back side of the template as seen from the reflective surface 46. Again, viewing the target from off axis or from other than the nominal viewing point will result in the creation of the moire interference pattern indicating that the viewer is not positioned at the nominal viewing point.

Yet another structure which could accomplish the same effect would be to mount the first template on a viewing device, such as a telescope, set at the focal plane, such that the first template would have the effect of being projected onto the second template when viewed through the telescope or viewing device.

The structures recited in connection with FIGS. 3A and 3B contemplated the use of a concentric ring moire template as illustrated in FIG. 1A. However, it should be noted that other, arbitrary, patterns may be used to accomplish the desired effects.

The resulting interference patterns of the type in FIG. 3A may be easily determined to test the effectiveness of the template design. In designing a circular concentric pattern, a number c,f factors must be considered: the nominal standoff distance, the number of patterns to be viewed as the viewer approaches the nominal viewing point, and the sensitivity of the patterns to off axis viewing. The parameters for designing the template represents a simple trigonometric analysis, as shown in FIG. 8. $P_1$ and $P_2$ are transmission patterns for a planoscope of the type shown in FIG. 1B. A simple trigonometric analysis follows from which pattern behavior based on a hard limited sinusoidal function.

Suppose patterns $P_1$ and $P_2$ are azimuthally symmetric; i.e., functions of only radius. Suppose, for purposes of implementation in a planoscope as in FIG. 1B that $P_1$ on template 10 is transmissive and pattern $P_2$ on template 20 is reflective. Let $r_1$ be the radius in pattern $P_1$ and let $r_2$ be the radius in pattern $P_2$. Let $f(\cdot)$ be a function of radius that will determine the patterns $P_1$ and $P_2$ in a way to be seen shortly. By causing the radial arguments of $f(\cdot)$ for patterns $P_1$ and $P_2$ to bear a linear relationship to each other we can cause the patterns themselves to have a perspective relationship. That is, there will be a point on the axis of the planoscope, viewed from which the patterns will appear conjugate to each other. Referring to FIG. 8, that perspective point is labeled $h_0$. We will let $g(\cdot)$ be the hard-limiting function such that $$g(x) = \begin{cases} 1, x \geq 0 \\ 0, x < 0 \end{cases}$$

The transmissive pattern $P_1$ could be expressed as $$P_1(r_1) = g\{\sin[f(r_1)]\}$$

and the reflective pattern $P_2$ similarly by $$P_2(r_2) = 1 - g\left(\sin\left[f\left(\frac{h_o}{h_o + d} \times r_2\right)\right]\right)$$

in which $f(\cdot)$ is the same function in the expressions for both $P_1$ and $P_2$. Complementing $P_2$ by subtracting $g(\cdot)$ from unity causes the pattern as observed from point $h_o$ in FIG. 8 to be all black, since we have set up a situation in which the moiré patterns multiply and each is either unity or zero. Suppose now that we view the pattern from a position h (other than $h_o$) along the axis, as indicated in FIG. 8. The location in pattern $P_2$ of template 20 viewed in projection through pattern $P_1$ at radius $r_1$ in template 10 has a value $$P_1(r_1) = g\{\sin[f(r_1)]\}$$

so the moiré pattern seen there has a value $$P_1(r_1) P_2\left(\frac{h+d}{h} r_1\right) =$$

-continued $$P_1(r_1)\left\{1 - P_1\left(\frac{h_o}{h_o + d} \cdot \frac{h+d}{h} r_1\right)\right\}$$

Some consideration will show that only at the critical point $h_o$ on the axis will the viewed pattern be entirely zero. Thus the moiré pattern indicates deviation from an easily defined position, and as we shall see, the observed pattern will also indicate the direction and distance from the observation point to the critical point We gain insight into the pattern if, for the moment, we disregard the hard limiting function $g(\cdot)$. Suppose that we take the simplest of useful functions for $f(\cdot)$; viz., $$f(r) = kr$$

We have the trigonometric identity $$\sin(\alpha)\sin(\beta) = [\cos(\alpha - \beta) - \cos(\alpha + \beta)]/2$$

We can thus decompose the product of the two templates into the sum of two sinusoids. One has the sum and the other the difference of the templates' frequencies in their arguments. Since the human visual system has differing response to visual stimuli of varying spatial frequency, with sensitivity peaking at a mid-range frequency, we can choose the constant k for $f(r) = kr$ so that the difference frequency term will have substantially higher visibility than the sum frequency. (This is the basis for standard multiplicative moiré theory.) The low frequency, visible, component of the moiré pattern as seen at position $r_1$ in template 10 is then $$A_{low} \propto \cos\left[f(r_1) - f\left(\frac{h_o}{h_o + d} \cdot \frac{h+d}{h} r_1\right)\right]$$

and in the simple case, $$A_{low} \propto \cos\left[kr_1\left(1 - \frac{h_o}{h_o + d} \cdot \frac{h+d}{h}\right)\right]$$

Figure 4A:
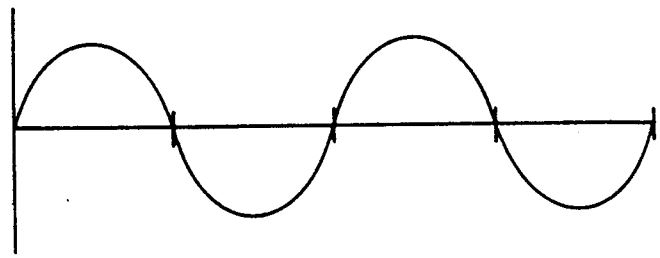
FIGS. 4A and 4B are a depiction of the transformable of the sine wave created by the interference pattern to a step function.
Figure 4B:
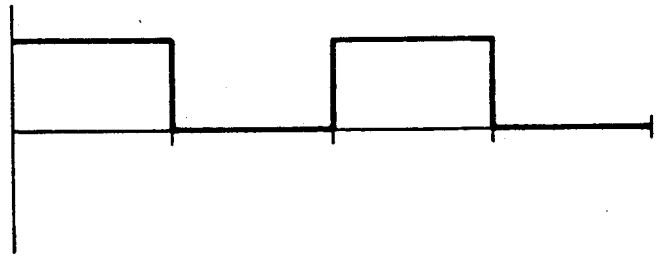

The pattern definition as depicted in FIG. 4A is then an approximation gained by applying the hard limiter, $g(\cdot)$, to that moiré pattern.

The pattern functions may also be adjusted for sensitivity to viewing position by adjusting the line width of the hard-limited opaque curves. In the formulation above this is easily accomplished by biasing the sinusoids before putting them into the hard limiter.

The pattern depicted in FIG. 2B results from a viewpoint that lies on the axis but at a distance $h \neq h_o$. The patterns that result from a viewpoint that is off the axis of the templates is easily determined. Suppose that we have the same patterns $P_1$ and $P_2$ as above, and that we are viewing $P_1$ with $P_2$ regarded as projected into it. Let the viewpoint be a distance e from the axis and let the perpendicular from the viewpoint to the axis fall a distance h from template 10. Let the axis defined by the centers of the templates be designated z, and let the perspective point be in the $(x_1, z_1)$ plane of a Cartesian system whose origin lies in the plane of template 10. Thus for a point $(x_1, y_1)$ in the plane of template 10 we have $$r_1 = \sqrt{x_1^2 + y_1^2}$$

and we need to find the related value $r_2$. From the definitions, we see that the projection of $(x_1,y_1)$ onto template 20 is at the point $(x_2,y_2)$ given by $$\frac{x_1 - e}{x_2 - e} = \frac{h}{h + d}$$

$$\frac{y_1}{y_2} = \frac{h}{h + d}$$

and we immediately have $$r_2 = \sqrt{x_2^2 + y_2^2}$$

which is used as the argument for $P_2$. The mathematics is straightforward and the person familiar with the art will immediately verify that the pattern indicated in FIG. 2A is the result of a viewpoint off the optical axis in the direction 34. The sign of the moiré pattern's motion in the direction 34, in response to a motion of the viewpoint, changes as the viewpoint has a z component greater than or less than $h_o$. The sensitivity of the technique is sufficiently great that slight motions of the viewpoint produce changes in the moiré pattern that unambiguously show what the direction to the axis is.

The above demonstrates the design of a set of moire templates which will permit the viewer to determine their position in three dimensions relative to a predetermined point in space. One application of such patterns is the alignment and docking of a space craft, such that the pilot of such craft need not have an on axis view through an active or moving docking port. Thus, the present invention would permit a shuttle pilot to dock with another object, such as a space station, without having to directly view docking ports. The pilot could rely upon a remote moire pattern to accurately determine the shuttle's position relative to the targeted dock.

Referring now to FIG. 9, which sets forth the method of determining a moire pattern or the type illustrated in FIG. 3B. In FIG. 9, a reflective base is shown as appear a distance d behind the pattern. The width of successive pattern rings and their placement may be determined as follows:

$$\frac{r_2}{r_1} = \frac{h_o + 2d}{h_o}$$

$$r_2 = \left(\frac{h_o + 2d}{h_o}\right) \cdot r_1$$

$$\frac{r_3}{r_2} = \left(\frac{h_o + 2d}{h_o}\right) \rightarrow \left(\frac{h_o + 2d}{h_o}\right)^2 r_1 = r_3$$

Therefore the radius of any ring may be determined as follows:

$$r_n = \left(\frac{h_o + 2d}{h_o}\right)^{n-1} r_1$$

Figure 7:
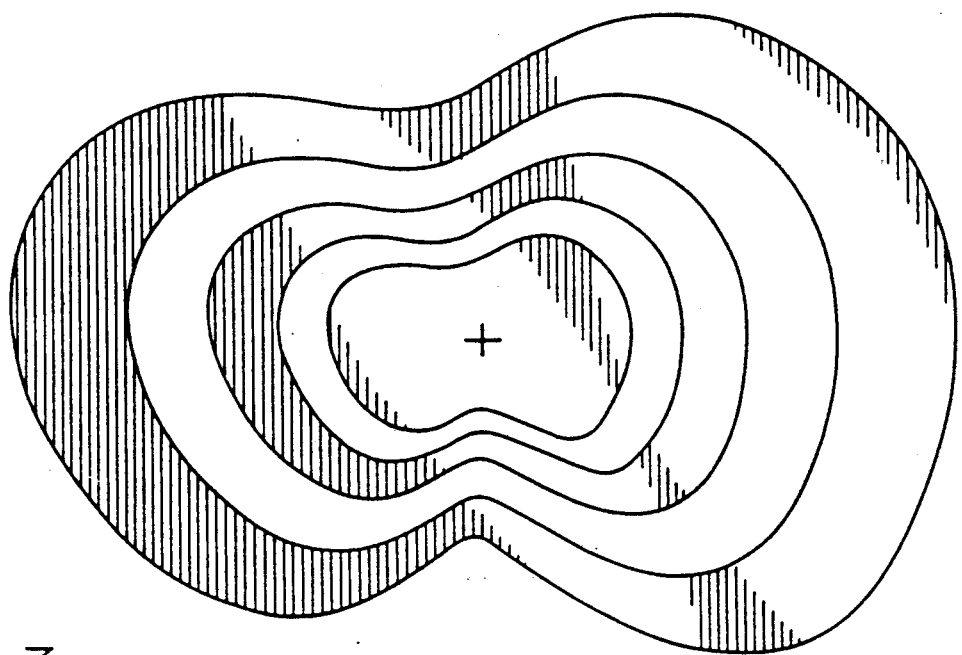
FIG. 7 depicts an asymmetric moire pattern.

Referring now to FIG. 7, it may be seen that a non-symmetrical moire pattern may also be used where $$r_n(\theta) = r_o(\theta)\left[\frac{h_o + 2d}{h_o}\right]^{n-1}$$

Figure 5B:
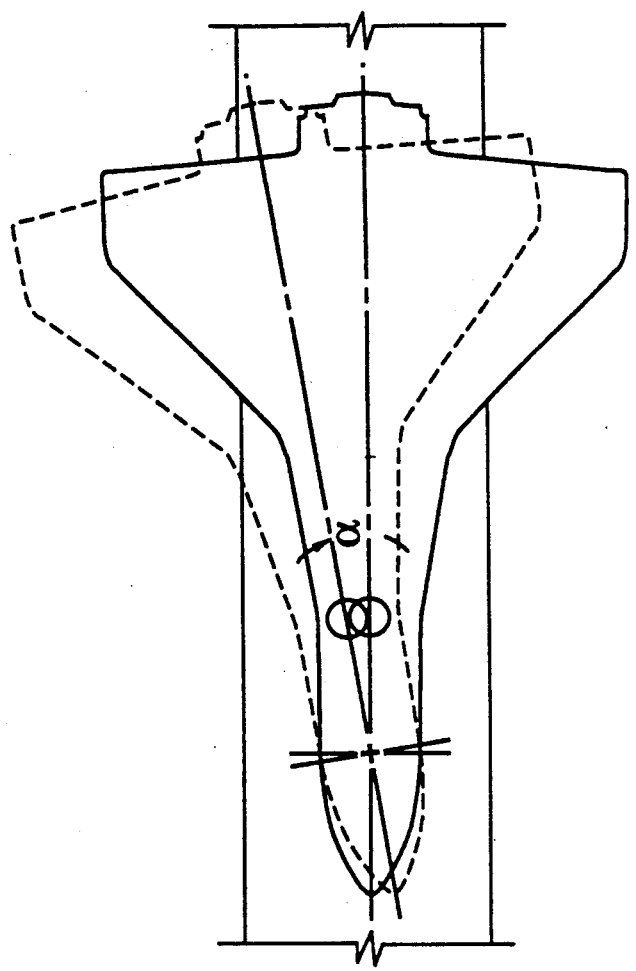
FIG. 5A and 5B are illustrative of one application of the present invention and the problems associated with rotational sensitivity. It is understood that one of the templates is mounted upon the reticle of a viewing device carried by the viewer.
Figure 5A:
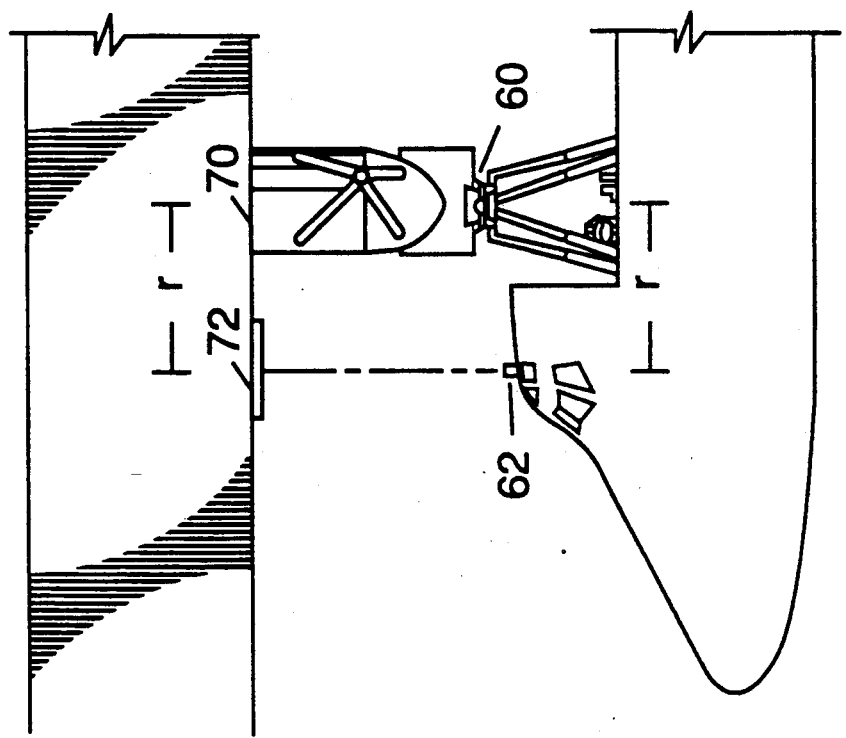
Figure 6:
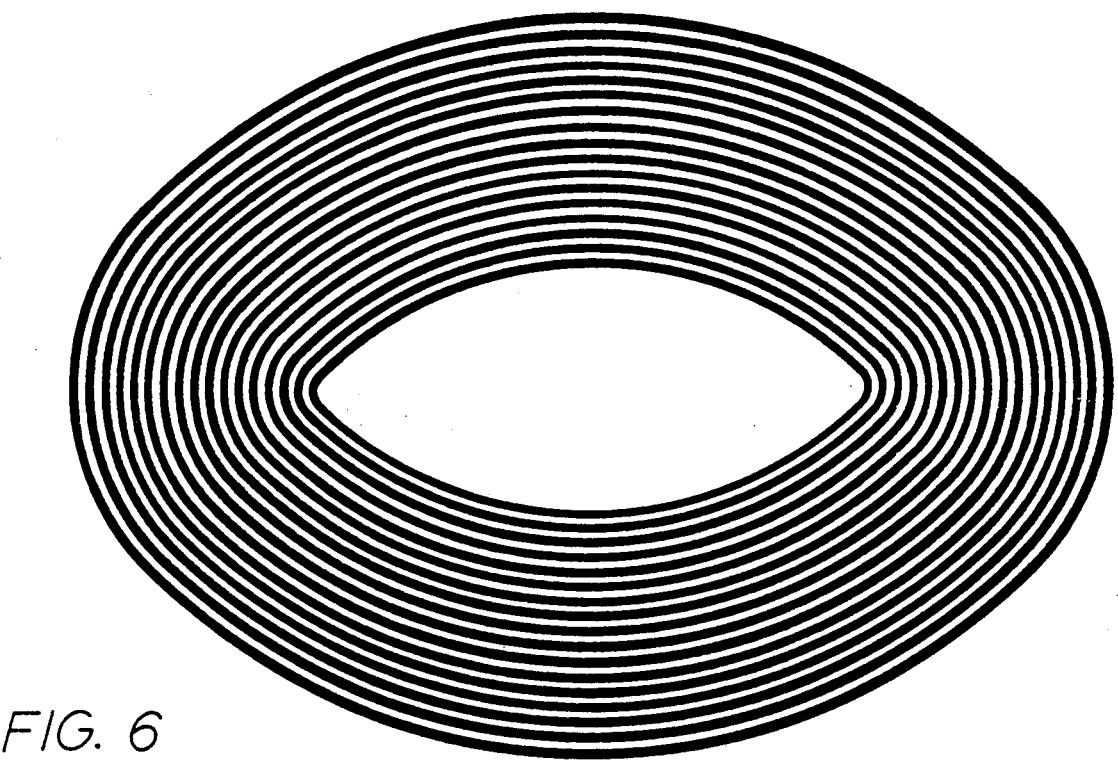
FIG. 6 is illustrative of a moire template of the type which demonstrates rotational as well as three dimensional sensitivity when a reticle displaying of the templates is carried with a viewing platform.

The present invention also is directed toward achieving rotational alignment relative to the predetermined point. The problem presented in instances such as shuttle docking is illustrated in FIG. 5A. Shuttle docking port 60 is located a fixed distance r from shuttle telescope 62 having a complementary moire template fixed at the telescope 62 focal plane. Similarly station docking port 70 is a fixed distance r from moire template target 72. Sensitivity to transnational displacement, as represented by X and Y is desirable in the present invention. However as shown i       r 1   "- ilacement, as represented by α 1  ..t ie..ily .    ..o.n a moire pattern of the type shown in FIG. 1A. The solution to this problem is to design a moire pattern which gives the viewer information relating to rotational positioning as well as transnational offset. The pattern may be of the types as shown in FIG. 6. An interference pattern will be created when the templates are not aligned in terms of X and Y position and/or when not rotationally aligned with the target.

The above discussion is illustrative of the present invention and various modifications and/or alterations will be apparent to those skilled in the art without departing from the scope of the invention as defined by the accompanying claims.

I claim:

1. An apparatus for optically determining position in three dimensional space relative to a predetermined point, comprising:
    (a) a rearward template, said template being part transparent and part opaque, the transparent and opaque portions form the pattern of said template forming a first regular two dimensional pattern about a center of said first pattern;
    (b) a forward template, said template being part transparent and part opaque, the transparent and opaque portions form the pattern of said template forming a second regular two dimensional pattern about the center of said second pattern, said forward template being disposed in a plane a distance D in front of said rearward template and parallel to said rearward template, the centers of said rearward and forward templates being aligned along an axis passing through said centers, such that said second pattern is complementary to said first pattern when viewed along said axis from a predetermined distance H from said rearward template; and
    (c) a means for mounting said templates.

2. The apparatus of claim 1 wherein said forward and rearward templates are disposed in parallel planes.

3. The apparatus of claim 2 wherein said means for mounting said templates comprises a rectangular box having opposed and parallel top and bottom sides, parallel and opposed side walls, said rearward and forward templates comprising the rear wall and front walls of said box.

4. The apparatus of claim 1, wherein said first and second regular patterns include a template having alternate transparent and opaque conc ntric bands of a uniform width.

5. The apparatus of claim 1, wherein said first and second regular patterns include patterns which are a function of radial displacement from the center of the respective pattern.

6. An apparatus for optically determining position in three dimensional space relative to a predetermined point, comprising:
   (a) a rearward template, said template being part transparent and part opaque, the transparent and opaque portions of said template forming a first regular two dimensional pattern about a center of said pattern; and
   (b) a forward template, said template being part transparent and part opaque, the transparent and opaque portions of said template forming a second regular two dimensional pattern about center of said second pattern, said forward template being mounted on a optical viewing device such that said second pattern is projected onto the viewing device focal plane, such that said second pattern is complementary to said first pattern when viewed along an axis passing through the center of said forward and rearward template at predetermined distance H from said rearward template.

7. The apparatus of claim 6, wherein said first and second regular patterns include a template having alternate transparent and opaque concentric bands of a uniform width.

8. The apparatus of claim 6, wherein said first and second regular patterns include patterns which are a function of radial displacement from the center of the respective pattern.

9. An apparatus for optically determining position in three dimensional space relative to a predetermined point, comprising:
   (a) a reflective surface disposed in a plane;
   (b) a template, said template being part transparent and part opaque, the transparent and opaque portions of said template forming a regular two dimensional pattern about the center of said pattern, said template being disposed in a plane parallel to said reflective surface, said pattern being such that when viewed along an axis perpendicular to said template and passing through the center of said pattern from a predetermined distance H from said reflective surface, the pattern appears to be self complementary; and
   (c) means for mounting said template in a plane parallel to said reflective surface a distance D from said reflective surface.

10. The apparatus of claim 9 wherein said means for mounting said template comprises a box having opposed and parallel top and bottom sides, parallel and opposed side walls, said reflective surface and said template comprising the rear wall and front walls of said box.

* * * * *